United States Patent
Koltachev et al.

(10) Patent No.: US 10,127,138 B2
(45) Date of Patent: Nov. 13, 2018

(54) DEBUGGING NATIVE CODE BY TRANSITIONING FROM EXECUTION IN NATIVE MODE TO EXECUTION IN INTERPRETED MODE

(71) Applicant: MICROSOFT TECHNOLOGY LICENSING, LLC., Redmond, WA (US)

(72) Inventors: Mikhail Koltachev, Kirkland, WA (US); Nikhil Khandelwal, Kirkland, WA (US); Akrosh Gandhi, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 188 days.

(21) Appl. No.: 13/911,108

(22) Filed: Jun. 6, 2013

(65) Prior Publication Data

US 2014/0366007 A1   Dec. 11, 2014

(51) Int. Cl.
G06F 9/44 (2018.01)
G06F 11/36 (2006.01)
G06F 8/53 (2018.01)

(52) U.S. Cl.
CPC ............ *G06F 11/3636* (2013.01); *G06F 8/53* (2013.01); *G06F 11/3664* (2013.01)

(58) Field of Classification Search
CPC .......................... G06F 11/3624; G06F 11/362

(Continued)

(56) References Cited

U.S. PATENT DOCUMENTS 5,058,052 A * 10/1991 Sexton ................ G06F 9/44589
                                                            714/48
5,339,422 A * 8/1994 Brender et al. ................. 714/4.1
(Continued)

FOREIGN PATENT DOCUMENTS

CN        101515248 A        8/2009
JP        S62113244 A        5/1987
(Continued)

OTHER PUBLICATIONS

"International Search Report & Written Opinion for PCT Patent Application No. PCT/US2014/040581", Dated: Sep. 23, 2014, 13 Pages.

(Continued)

*Primary Examiner* — Satish Rampuria

(57) ABSTRACT

A dual-mode debugger can debug native code or interpreted code. Transitioning between modes can be triggered by defined bailout conditions. A program can be debugged by attaching a debugger and compiling the program into native code under the debugger. At defined points in the program, debugging can transition from native mode to interpreted mode. Debugging the native code can stop, current state can be captured, and an interpreter can be instantiated. An interpreter stack can be created and can be populated with the captured current state. Debugging operations which involve execution control: pausing execution, continuing execution, stepping into, out of or over a section of code and so on, can occur in interpreted mode, which is typically easier to implement. Debugging operations which involve inspection and modification of variables can occur in native mode.

20 Claims, 7 Drawing Sheets

(58) Field of Classification Search
USPC .................................................. 717/124–167
See application file for complete search history.

(56) References Cited

U.S. PATENT DOCUMENTS

| | | | | |
|---|---|---|---|---|
| 5,363,320 | A * | 11/1994 | Boyle ................. | G06F 17/5036 |
| | | | | 703/2 |
| 5,450,575 | A * | 9/1995 | Sites ................... | G06F 11/3604 |
| | | | | 714/38.1 |
| 5,732,210 | A * | 3/1998 | Buzbee ...................... | 714/38.13 |
| 5,889,981 | A * | 3/1999 | Betker et al. ................. | 712/227 |
| 5,901,315 | A * | 5/1999 | Edwards et al. ............. | 717/124 |
| 5,956,479 | A * | 9/1999 | McInerney ......... | G06F 11/3664 |
| | | | | 714/38.13 |
| 6,158,045 | A * | 12/2000 | You ..................... | G06F 11/3664 |
| | | | | 714/E11.21 |
| 6,249,907 | B1 | 6/2001 | Carter et al. | |
| 6,434,741 | B1 * | 8/2002 | Mirani ................ | G06F 11/3628 |
| | | | | 714/E11.209 |
| 6,910,206 | B1 | 6/2005 | Nevill | |
| 6,996,814 | B2 | 2/2006 | Bak | |
| 7,020,879 | B1 * | 3/2006 | Nemirovsky et al. ........ | 718/107 |
| 7,124,407 | B1 * | 10/2006 | Wallman ....................... | 717/154 |
| 7,203,926 | B2 * | 4/2007 | Bogle ................. | G06F 9/45512 |
| | | | | 714/E11.21 |
| 7,370,320 | B1 * | 5/2008 | Grossman et al. ........... | 717/131 |
| 8,997,049 | B1 * | 3/2015 | Melnikov ................. | G06F 8/43 |
| | | | | 717/124 |
| 2002/0112227 | A1 | 8/2002 | Kramskoy et al. | |
| 2002/0129337 | A1 * | 9/2002 | Evans ................... | G06F 11/362 |
| | | | | 717/124 |
| 2002/0138821 | A1 * | 9/2002 | Furman et al. ................ | 717/128 |
| 2003/0154464 | A1 * | 8/2003 | Ullmann et al. .............. | 717/130 |
| 2003/0204838 | A1 * | 10/2003 | Caspole et al. ............... | 717/130 |
| 2004/0210876 | A1 * | 10/2004 | Stall et al. ..................... | 717/127 |
| 2004/0267766 | A1 * | 12/2004 | Marek et al. ................. | 707/100 |
| 2005/0034104 | A1 | 2/2005 | Pugh et al. .................... | 717/124 |
| 2005/0039187 | A1 * | 2/2005 | Avakian et al. ............... | 719/310 |
| 2006/0161896 | A1 * | 7/2006 | Hicks .................... | G06F 11/362 |
| | | | | 717/124 |
| 2007/0089090 | A1 * | 4/2007 | Riedl et al. .................... | 717/120 |
| 2008/0046868 | A1 * | 2/2008 | Tsantilis ........................ | 717/136 |
| 2009/0210862 | A1 * | 8/2009 | Viswanadha et al. ........ | 717/125 |
| 2010/0050162 | A1 * | 2/2010 | Alkins ................ | G06F 11/3471 |
| | | | | 717/128 |
| 2012/0011513 | A1 * | 1/2012 | McConaughy ......... | G06F 9/545 |
| | | | | 718/100 |
| 2012/0117041 | A1 | 5/2012 | Rodriguez et al. | |
| 2012/0331351 | A1 * | 12/2012 | Davis ................. | G06F 11/3664 |
| | | | | 714/38.1 |
| 2013/0007720 | A1 * | 1/2013 | Cai ..................... | G06F 11/3664 |
| | | | | 717/130 |
| 2013/0031536 | A1 | 1/2013 | De et al. | |
| 2013/0132063 | A1 * | 5/2013 | Rieschl et al. .................. | 703/28 |

FOREIGN PATENT DOCUMENTS

| | | |
|---|---|---|
| JP | H0434625 A | 2/1992 |
| JP | H08286896 A | 11/1996 |
| JP | H10187489 A | 7/1998 |
| JP | 2009252113 A | 10/2009 |
| RU | 2390821 C1 | 5/2010 |

OTHER PUBLICATIONS

Chase, et al., "Selective Interpretation as a Technique for Debugging Computationally Intensive Programs", In ACM Proceeding of the Symposium on Interpreters and Interpretive Techniques, vol. 22 Issue 7, Jul. 1, 1987, pp. 113-124.

Miadowicz, Andrew, "Advances in JavaScript Performance in IE10 and Windows 8", Retrieved at <<http://blogs.msdn.com/b/ie/archive/2012/06/13/advances-in-javascript-performance-in-ie10-and-windows-8.aspx>>, Jun. 14, 2012, pp. 1-16.

"Introduction", Retrieved at <<http://pauillac.inria.fr/~haemmerl/gprolog-rh/doc/manual005.html>>, Retrieved Date: Apr. 23, 2013, p. 1.

"Dbx Modes for Debugging Java Code", Retrieved at <<http://docs.oracle.com/cd/E19205-01/819-5257/blank/index.html>>, Retrieved Date: Apr. 23, 2013, p. 1.

Anderson, David, "IonMonkey: Implement Bailouts", Retrieved at <<https://bugzilla.mozilla.org/show_bug.cgi?id=670827>>, Jul. 7, 2011, pp. 1-14.

"Second Written Opinion Issued in PCT Application No. PCT/US2014/040581", Dated: Jun. 26, 2015, 7 Pages.

"International Preliminary Report on Patentability Issued in PCT Application No. PCT/US2014/040581", Dated: Sep. 29, 2015, 8 Pages.

"First Office Action and Search Report Issued in Chinese Patent Application No. 201480043987.3", Dated: Oct. 19, 2017, 16 Pages.

"Office Action Issued in Mexican Patent Application No. MX/a/2015/016740", Dated: Apr. 28, 2017, 8 Pages. (With English Translation).

"Office Action Issued in Mexican Patent Application No. MX/a/2015/016740", Dated: Nov. 28, 2017, 18 Pages.

"Second Office Action Issued in Chinese Patent Application No. 201480043987.3", dated Jun. 27, 2018, 7 Pages.

"Office Action Issued in Russian Patent Application No. 2015152048", dated May 17, 2018, 12 Pages.

"Kernel Debugging with WinDbg", Retrieved from https://web.archive.org/web/20130107021356/http://easefilter.com:80/Forums_Files/kernel_debugging__tutorial.htm, Jan. 7, 2013, 3 Pages.

"UX Software Programming Environment", 3rd Edition, MKSPACE Reference, NEC Corporation, Jan. 31, 1995, pp. 76-77.

"Office Action issued in Japanese Patent Application No. 2016-518389", dated Jul. 5, 2018, 11 Pages.

* cited by examiner

DEBUGGING NATIVE CODE BY TRANSITIONING FROM EXECUTION IN NATIVE MODE TO EXECUTION IN INTERPRETED MODE

BACKGROUND

A compiler can produce executable code by compiling source code into code that can be executed by a particular processor. This type of processor-specific code is referred to as "native code", machine instructions that can be executed by a particular type of processor but not by any type of processor. Another type of compiler can receive source code and produce an intermediate code or virtual machine byte code that is not processor-specific. Intermediate code is typically received by an intermediate language compiler (e.g., a just-in-time (JIT) compiler), and compiled into native code right before the program executes. Intermediate code is not platform-specific.

An interpreter reads source code or intermediate code and executes the code statement by statement without translating the code into native code. Typically, interpreting code is slower than executing native code. Interpreting code is typically slower than JIT-compiling intermediate code into native code and executing the native code.

Implementation of a debugger for interpreted code is typically less complex than implementation of a debugger for native code. However, response time is typically faster for a debugger for native code that for a debugger for interpreted code. A debugger typically provides a user with the ability to control execution of a program by stepping into or out of a function, stepping over a function, pausing and resuming execution, inspecting the current value of a variable or stack location and so on.

SUMMARY

A dual-mode debugger as described herein can debug native code representing a program. In response to detecting a defined debug bailout condition in the program being debugged, the debugger can stop debugging the native code representing the program and can transition to debugging corresponding interpreted code representing the program. In native mode the debugger can debug native code representing the program. Debug operations that provide inspection and/or modification of current values of program variables and/or stack information can execute in native mode. In native mode debugging, each time a variable is saved into a register (e.g., when a variable is defined in the program), the value can also be saved to a stack location for the function. Variables for a function being debugged can be stored in a particular localized area of the stack reserved for the program being debugged. The same area of the stack can be used during compilation into native code for spilling (i.e., when there are more live variables than the computing device has registers, variables may be "spilled" from registers to memory). The stack locations can be used by the debugger to get and change values of variables.

In response to detection of a bailout condition, debugging the native code representing the program can stop. The interpreter can receive interpreted code representing the program, the received interpreted code corresponding to the native code being debugged, and can resume debugging the interpreted code for the program, running in interpreted mode. For example, debug operations that control execution of the program being debugged can run in interpreted mode. Execution control operations can be implemented by asynchronous break, stepping, breakpoint, and/or break on exception operations. Interpreter mode debugging can be used for debugging the top-most function (the function whose variable values are located in the top-most frame of the stack) while using native mode to debug other parts of the program.

The debugger can transition from debugging in native mode to debugging in interpreted mode at defined bailout points. A bailout engine associated with the debugger can receive a bailout record comprising current state of the native code executing under the debugger. The bailout engine can instantiate an instance of an interpreter, create an interpreter stack frame for the instance of the interpreter and can populate the interpreter stack frame created for the instance of the interpreter with values from the bailout record. Debugging of the program can resume on analogous corresponding interpreted code for the program. Debug bailout points are locations in the program at which native mode debugging may transition to interpreted mode debugging, providing certain bailout conditions are met. Debug bailout points such as at the beginning of a function, at the back edge of a loop, when a function returns, when a call to a helper function or library returns, or when a debugger statement is encountered, can be defined for the program. When a debug bailout point is encountered in a debug session, the status of runtime debug flags and stack depth checks of stack frames can be used to determine if debug bailout conditions are met. If debug bailout conditions are met, code corresponding to the native code executing under the debugger can be sent to the interpreter and debugging can proceed on the corresponding interpreted code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A program can be debugged by compiling it into native code and debugging the native code. At defined points in the program, debugging can transition from native mode to interpreted mode, and debugging can continue on the interpreted code. Debugging operations which involve execution control: pausing execution, continuing execution, stepping into, out of or over a section of code and so on, can occur in interpreted mode. Debugging operations which involve inspection and modification of variables can occur in native mode. The dual-mode debugger can combine the speed of native mode debugging with the simplicity of interpreted mode debugging.

Figure 1A:
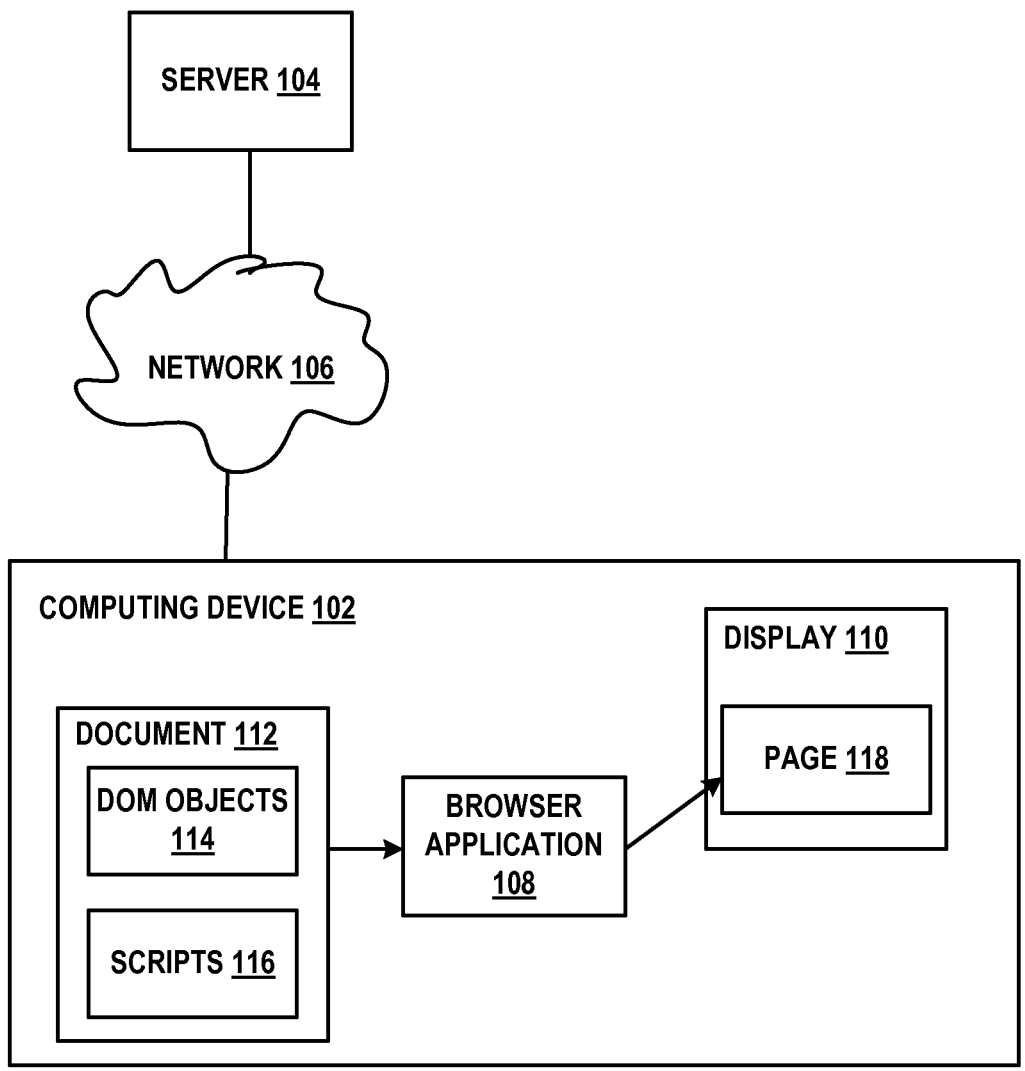
FIG. 1a illustrates an example of a system 100 that includes a browser application that renders pages from received documents.

Debugging Native Code by Transitioning from Execution in Native Mode to Execution in Interpreter Mode FIG. 1a illustrates an example of a web browsing environment 100, in accordance with some aspects of the subject matter disclosed herein. As shown in FIG. 1a, environment 100 can include one or more of: a computing device 102, a server 104, a network 106 and a browser application 108. Web browsing environment 100 may include other components known in the arts.

Computing device 102 can be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of mobile device. Server 104 may be implemented in one or more computer systems, including one or more servers, which may be any type of computing device described herein or otherwise known that is capable of enabling the corresponding functionality described herein.

Computing device 102 and server 104 can be communicatively coupled by network 106. Network 106 can include one or more communication links and/or communication networks, such as a PAN (personal area network), a LAN (local area network), a WAN (wide area network), or a combination of networks, such as the Internet. Computing device 102 and server 104 may be communicatively coupled to network 106 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Browser application 108 can be a program that can execute on computing device 102. Browser application 108 can enable network information resources to be retrieved, presented, and traversed. An information resource or object can be retrieved by browser application 108 using a network address, such as a uniform resource identifier (URI). Examples of information resources include web pages, images, videos, and other forms of content. Hyperlinks that are present in information resources enable users easily to navigate their browsers to related resources. Examples of browser application 108 include but are not limited to Internet Explorer®, developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome of Mountain View, Calif.

Browser application 108 can retrieve a document 112 from a server 104 through network 106. Document 112 can be a web document that includes code of a markup language, such as Hyper Text Markup Language (HTML), dynamic HTML (DHTML), extensible HTML (XHTML), extensible markup language (XML), etc. Document 112 can include DOM (document object model) objects 114 and one or more script(s) 116. DOM objects 114 can include one or more objects represented in document 112 according to the DOM convention, which is a cross-platform and language-independent convention for representing and interacting with objects. DOM objects 114 may include objects that are directly included in document 112, and/or are referenced by document 112 and separately retrieved from server 104 or other server. Script(s) 116 include code formatted according to a dynamic language (e.g., JavaScript, VBScript, AJAX, Python, Perl, etc.) that enables changes to be made to DOM objects 114, including changes based on factors such as user input, environmental conditions (e.g., the time of day, or other variables), etc. The code of script(s) 116 can access and modify objects of DOM objects 114 on the fly without returning to server 104.

Browser application 108 can receive (e.g., load) document 112. Browser application 108 can include a browser engine (e.g., a layout engine or rendering engine) that formats information of document 112, and displays the formatted information. For example, as shown in FIG. 1a, browser application 108 can generate a page 118 based on document 112 that is displayed by a display 110 of computing device 102. Browser application 108 can be configured to execute one or more scripts 116 that are embedded in document 112, or that are separate from but associated with document 112.

Figure 1B:
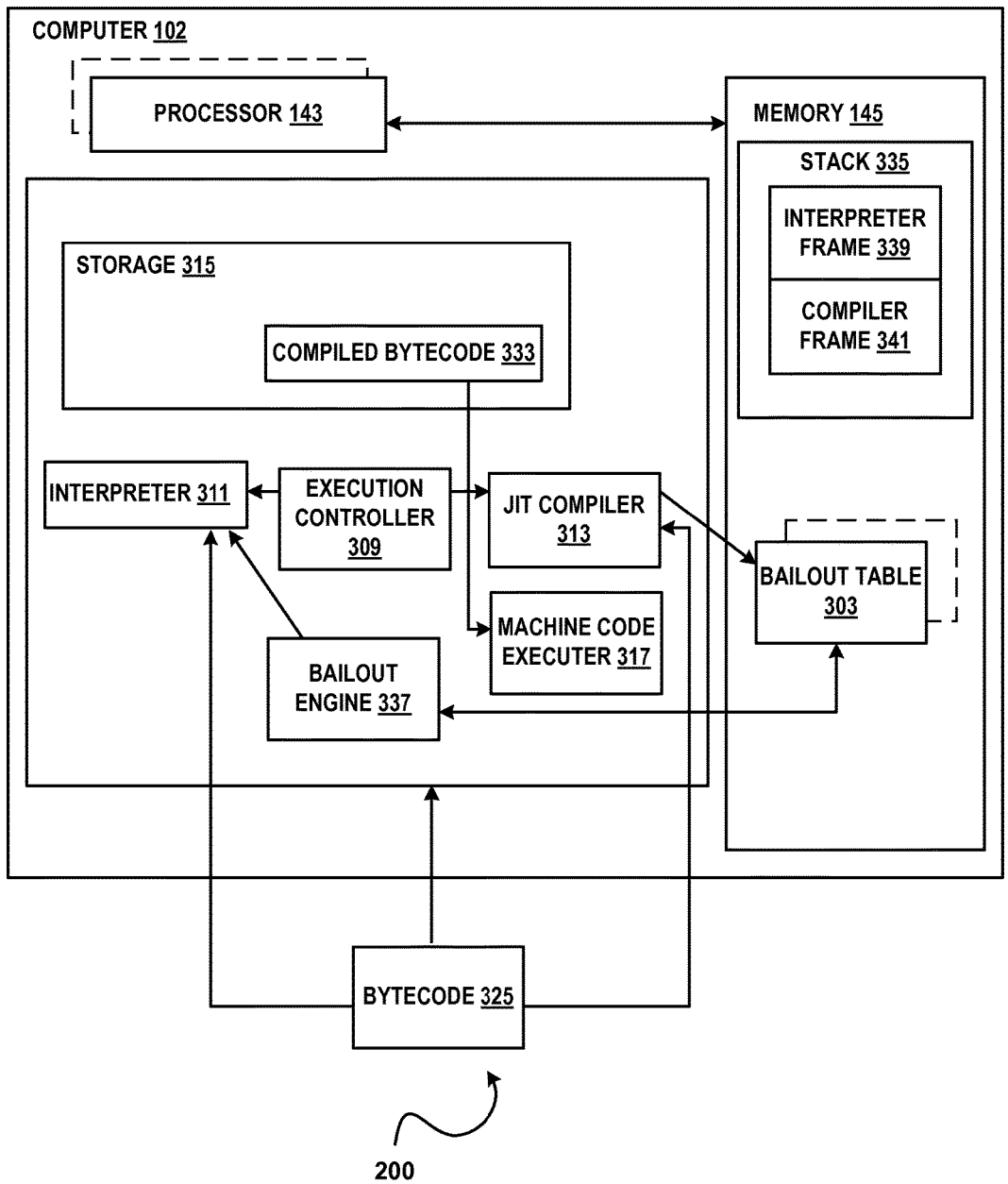
FIG. 1b illustrates an example of a system 200 comprising a runtime engine that can transfer from executing compiled code to interpreting code in accordance with aspects of the subject matter disclosed herein.

FIG. 1b illustrates a block diagram of a system 200, according to some aspects of the subject matter disclosed herein. System 200 can include one or more computers or computing devices such as computing device 102 including one or more processors such as processor 143, etc. memory 145, an execution controller 309, an interpreter 311, a compiler such as a JIT (just-in-time) compiler 313, storage 315, a machine code executer 317, and a bailout engine 337. The execution controller 309, interpreter 311, compiler such as a JIT compiler 313, storage 315, machine code executer 317, and bailout engine 337 can be implemented as one or more program modules which when loaded into memory 145 cause the one or more processors 143, etc. to perform the actions attributed to the execution controller 309, interpreter 311, compiler such as a JIT compiler 313, machine code executer 317, and bailout engine 337, respectively. System 200 may include other components known in the arts which are not shown.

The execution controller 309, interpreter 311, and/or JIT compiler 313 can receive bytecode generated from source code. Source code can be any source code written in a programming language, such as but not limited to dynamic scripting languages such as but not limited to JavaScript, VBScript, Python and so on. The source code can be parsed and bytecode can be generated from the parsed source code. Based on bytecode 325 and profile, heuristic or other information, execution controller 309 can enable one of interpreter 311 and JIT compiler 313 to operate on bytecode 325. Interpreter 311 can be configured to interpret bytecode 325 when enabled by an interpreter control signal received from execution controller 309. JIT compiler 313 can be configured to compile bytecode 325 when enabled by a compiler control signal received from execution controller 309.

When interpreter 311 is enabled by an interpreter control signal, interpreter 311 can interpret and execute bytecode 325. Interpreter 311 can be implemented as a JavaScript interpreter, a VBScript interpreter, a Python interpreter, or as an interpreter for another dynamic language or dynamic scripting language mentioned elsewhere herein or otherwise known. In this manner, the source code can be at least partially executed by operation of the interpreter 311. Similarly, in response to receiving an enabling compiler control signal, JIT compiler 313 can compile bytecode 325. JIT compiler 313 can be implemented as a JavaScript compiler, a VBScript compiler, a Python compiler, or as a compiler for another dynamic language or dynamic scripting language mentioned elsewhere herein or otherwise known. JIT compiler 313 is referred to as a "just in time" compiler, because particular bytecode portions may be compiled by JIT compiler 313 as the compiled bytecode is needed (e.g., is going to be executed imminently) rather than pre-compiling bytecode 325 in its entirety prior to execution. JIT compiler 313 can generate compiled bytecode 333, having the form of machine executable code or instructions.

JIT compiler 313 can perform code optimizations, based on assumptions as described above. JIT compiler 313 can insert one or more pre-determined bailout points in the compiled bytecode it generates. For each bailout point, a bailout table such as bailout table 303, etc. can be created in which the location of variables, a location in the bytecode 325 or in the source code corresponding to the bailout point location and other information can be recorded. The bailout table 303, etc. can describe where to find variables on the stack or in the register. JIT compiler 313 can generate the one or more bailout tables and can save them with the optimized compiled bytecode (e.g., as machine code). The bailout table can be optimized by avoiding extension of the lifetimes of variables unnecessarily by encoding the information in the bailout table. For example, if it is known that the value of variable x is the constant 10, at bailout time, x=10 can be encoded in the bailout table so that the value 10 does not need to be in memory or in a register to be resurrected. Similarly, when more than one variable has the same value, (e.g., x=y;) at the bailout point the same location can be used in the bailout table for all variables having the same value if this information is encoded in the bailout table (e.g., the same location in the bailout table can be used for x and y). These techniques can make register allocation more efficient. Optimized compiled bytecode can be stored in storage 315 as compiled bytecode 333 for access during subsequent execution of the program by system 200.

When the optimized compiled bytecode is executed, optimized compiled bytecode 333 can be received by machine code executer 317 (which can be one or more processors such as processor 143, etc.). Executing compiled bytecode can be associated with a compiler frame 341 on stack 335. The underlying assumption or assumptions on which the optimizations were based can be determined to be valid or invalid at each bailout point. In response to determining that the assumption(s) are valid, the optimized compiled code can continue to execute. In response to determining that the assumption(s) are invalid, execution of the optimized compiled code can be stopped. The bailout table for that bailout point can be passed to the bailout engine 337. The bailout engine 337 can restore the state (e.g., value) of variables needed by the interpreter. The bailout engine can create a new frame (e.g., interpreter frame 339) for the stack 335. If a variable needed by the interpreter has become inactive the bailout engine 337 can resurrect a variable by changing the state of the variable from inactive to active. The bailout engine 337 can instantiate an instance of the interpreter 311, pass the interpreter the location in the bytecode corresponding to the bailout point in the optimized compiled code and the newly created interpreter frame including the values of all the restored active variables. Hence source code from which the bytecode 325 was generated can thus be partially executed by operation of JIT compiler 313 and machine code executer 317 and partially executed by interpreter 311.

Figure 1C:
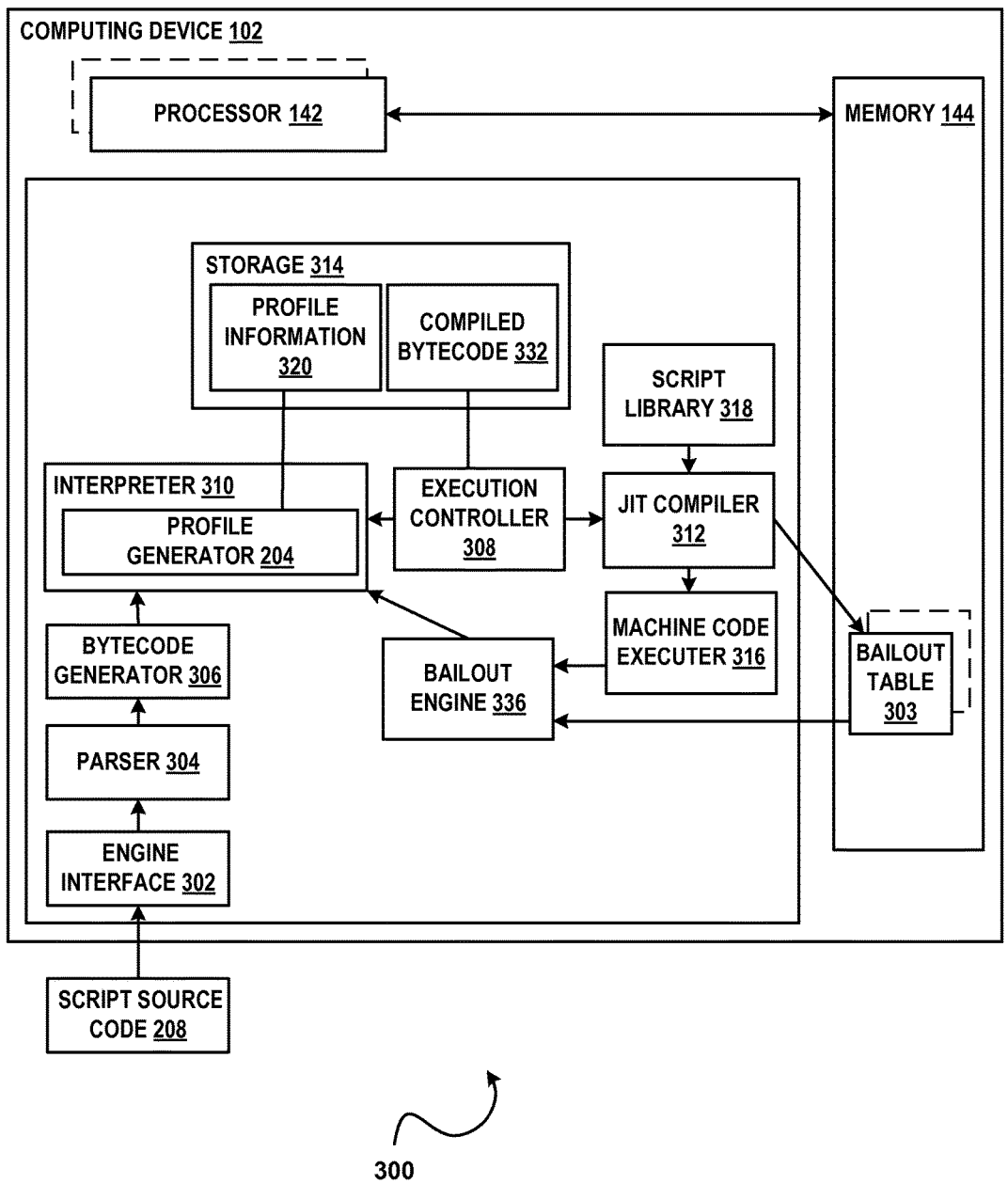
FIG. 1c illustrates an example of a system 300 comprising a runtime engine that can transfer from executing compiled code to interpreting code in accordance with aspects of the subject matter disclosed herein.

FIG. 1c illustrates another example of a system, system 300 in accordance with aspects of the subject matter disclosed herein. A system 300 can include a computing device such as computing device 102 comprising one or more processors such as processor 142, etc., memory 144, and a runtime engine that includes one or more of the following: an engine interface 302, a parser 304, a bytecode generator 306, an execution controller 308, an interpreter 310, a compiler such as but not limited to a JIT (just-in-time) compiler 312, storage 314, a machine code executer 316, a bailout engine 336 and a script library 318. System 300 may include other components known in the arts that are not shown.

As shown in FIG. 1c, engine interface 302 can receive script source code 208. Engine interface 302 can be present or not present. Parser 304 can be configured as an interface to the runtime engine rather than having engine interface 302 present. When present, engine interface 302 can be a communication interface that provides one or more methods for interfacing a host with the runtime engine of FIG. 1c. In accordance with some aspects of the subject matter disclosed herein, engine interface 302 can be implemented according to IActiveScript developed by Microsoft Corporation of Redmond, Wash. Engine interface 302 can provide source code 208 to parser 304.

Parser 304 can receive and parse source code 208. Parser 304 can perform token generation or lexical analysis on source code 208, so that source code 208 is formatted into symbols or tokens. Parser 304 can perform error checking on the tokens to determine whether allowable expressions are formed, that syntax errors are not present, etc. Parser 304 can output the parsed source code as parsed source code (not shown). Parsed source code can have any suitable form, including being generated by parser 304 as AST (abstract syntax tree) code, which includes a tree representation of the abstract syntactic structure of source code 208, as would be known to persons skilled in the relevant art(s).

Bytecode generator 306 can receive the parsed source code. Bytecode generator 306 can be configured to convert the parsed source code into bytecode, which includes instruction sets configured for efficient execution by an interpreter, as well as for further compilation into machine code. Generated bytecode can represent the parsed source code as numeric codes and corresponding optional parameters. Bytecode generator 306 can output the generated bytecode (not shown). The bytecode can have any suitable form, including being generated by bytecode generator 306 in the form of p-code (portable code), as would be known to persons skilled in the relevant art(s).

Execution controller 308, interpreter 310, and JIT compiler 312 can each receive the generated bytecode. Interpreter 310 or machine code executer 316 can include profile generator 204. Profile generator 204 can be configured to analyze the generated bytecode to collect statistics and further information regarding source code 208. Profile generator 204 can generate profile information 320, which can include the collected information, and which can be stored in storage 314.

Execution controller 308 can access profile information 320, and can be communicatively coupled to interpreter 310 and JIT compiler 312. Based on the generated bytecode and profile information 320, execution controller 308 can enable one of interpreter 310 and JIT compiler 312 to operate on the generated bytecode. Interpreter 310 can be configured to interpret the generated bytecode when enabled by an interpreter control signal received from execution controller 308. JIT compiler 312 can be configured to compile the generated bytecode when enabled by a compiler control signal received from execution controller 308. For example, during a first execution of source code 208, profile information 320 may not yet exist. In such a case, execution controller 308 can enable interpreter 310 to interpret the generated bytecode and to generate profile information 320. During a subsequent execution of source code 208 (e.g., later during the same first execution of source code 208, and/or during a subsequent execution of source code 208), execution controller 308 can enable interpreter 310 to interpret portions of source code 208, and can enable JIT compiler 312 to compile other portions of source code 208, based on profile information 320.

When interpreter 310 is enabled by the interpreter control signal, interpreter 310 can interpret and execute the generated bytecode. Interpreter 310 can be implemented as a JavaScript interpreter, a VBScript interpreter, a Python interpreter, or as an interpreter for another dynamic language mentioned elsewhere herein or otherwise known. In this manner, source code 208 may be at least partially executed by operation of interpreter 310.

When JIT compiler 312 is enabled by a compiler control signal, JIT compiler 312 can compile generated bytecode. JIT compiler 312 can be implemented as a JavaScript compiler, a VBScript compiler, a Python compiler, or as a compiler for another dynamic language mentioned elsewhere herein or otherwise known. JIT compiler 312 is referred to as a "just in time" compiler, because particular bytecode portions may be compiled by JIT compiler 312 as the compiled bytecode is needed (e.g., is going to be executed imminently) rather than pre-compiling the bytecode in its entirety prior to execution. JIT compiler 312 can generate compiled bytecode 332, which can have the form of machine executable code or instructions.

JIT compiler 312 can perform code optimizations, based on assumptions as described above. JIT compiler 312 can insert one or more pre-determined bailout points in the compiled bytecode it generates. For each bailout point, a bailout table such as bailout table 303, etc. can be created in which the state of variables can be recorded, a location in the generated bytecode corresponding to the bailout point location. The bailout table can describe where to find variables on the stack or in the register of the machine code. JIT compiler 312 can generate the tables and save them with the optimized compiled bytecode 332 (e.g., machine code). Optimized compiled bytecode 332 can be stored in storage 314 as compiled bytecode 332 for access during subsequent execution of the program by system 300.

When the optimized compiled bytecode is executed, optimized compiled bytecode 332 can be received by machine code executer 316 (which can be one or more processors such as processor 142, etc.). The underlying assumption or assumptions on which the optimizations were based can be checked for validity or invalidity at each bailout point. In response to determining that the assumption(s) are valid, the optimized compiled bytecode 332 can continue to execute. In response to determining that the assumption(s) are invalid, execution of the optimized compiled code can be stopped. The bailout table for that bailout point can be passed to the bailout engine 336. The bailout engine 336 can restore the state (e.g., value) of variables needed by the interpreter. If a variable needed by the interpreter has become inactive the bailout engine 336 can resurrect a variable by changing the state of the variable from inactive to active. The bailout engine 336 can instantiate an instance of the interpreter 310, pass the interpreter the location in the bytecode corresponding to the bailout point in the optimized compiled code, the variables and their locations. Hence source code from which the bytecode was generated can thus be partially executed by operation of JIT compiler 312 and machine code executer 316 and can be partially executed by interpreter 310.

Use of bailouts can enable a number of optimizations. A variable in many dynamic programming languages can be a date, a string, an array, an integer, and so on. In some dynamic languages, an object is created for the variable and the location stored in the register and subsequently in the table comprises a pointer to the object. The object itself can store the description of the object and data for the object. Thus if variable a is a string, an object can be created for the string, a pointer to the object can be stored and the object itself can identify that variable a is a string and can specify the string itself (e.g., "Hello World"). One optimization for this schema for the case in which the variable is assumed based on profile data to be an integer is to store the integer itself in the variable instead of the pointer to the object created for the integer, or an encoded value to represent and describe that integer object. One scheme to encode integer objects directly is to use one of the bits of the word to store an indicator that denotes that the value is an integer. Thus in the case of a 32-bit processor, one bit of the 32 bits can indicate that the contents of the other 31 bits represent the integer value or can indicate that the contents of the other 31 bits do not represent the integer value.

Figure 1D:
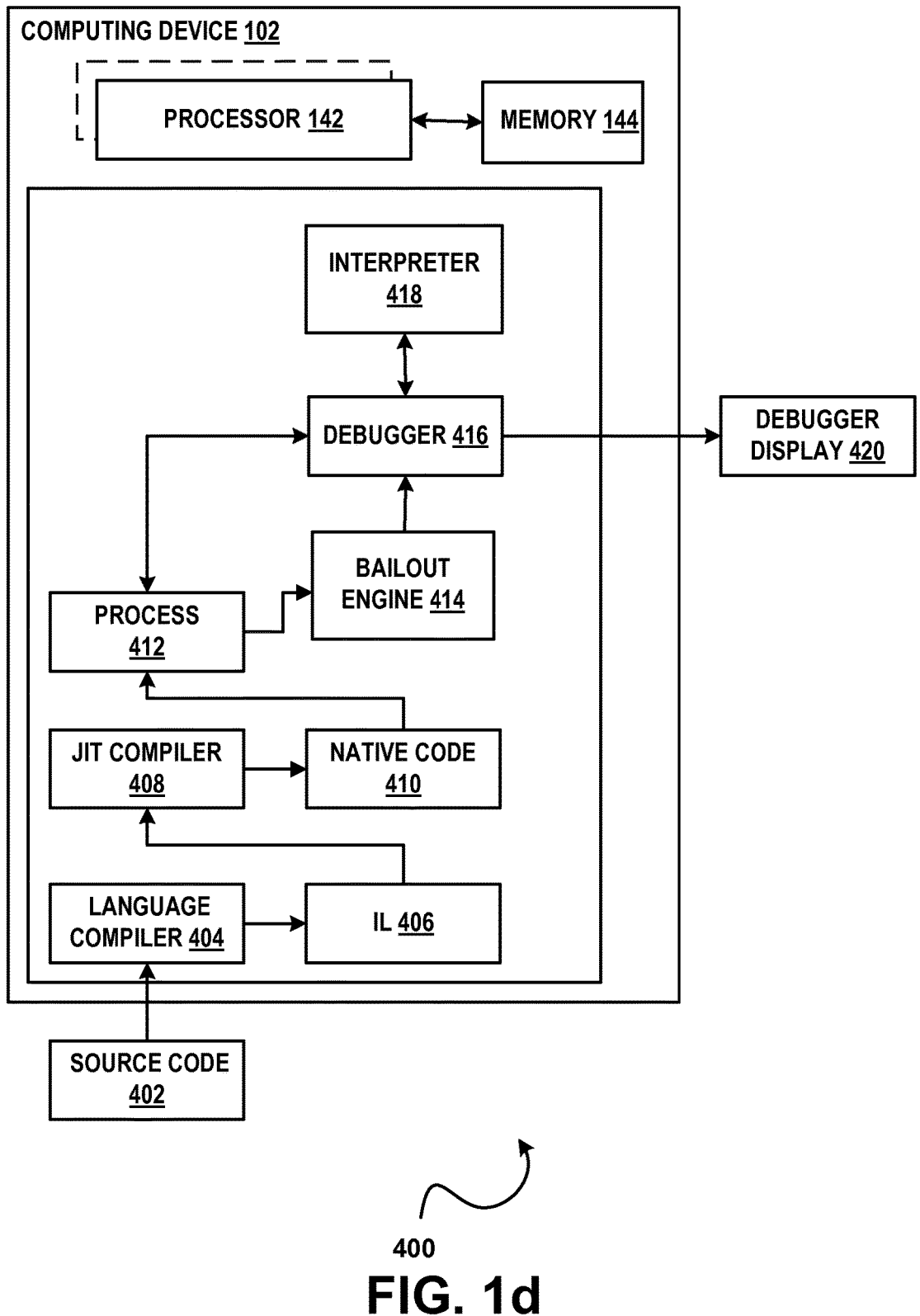
FIG. 1d illustrates an example of a system 400 that can debug code by transitioning from native mode to interpreted mode in accordance with aspects of the subject matter disclosed herein.

FIG. 1*d* illustrates an example of a system 400 that can debug native code by transitioning from executing in native mode to executing in interpreted mode in accordance with aspects of the subject matter disclosed herein. All or portions of system 400 may reside on one or more computers or computing devices such as the computers described below with respect to FIG. 3. System 400 can comprise a system as illustrated in FIG. 1*b* and/or FIG. 1*c* to which a debugger, etc. as described herein has been added. System 400 or portions thereof may be provided as a stand-alone system or as a plug-in or add-in. System 400 may execute in whole or in part on a software development computer such as the software development computer described with respect to FIG. 4. All or portions of system 400 may be operated upon by program development tools. For example, all or portions of system 400 may execute within an integrated development environment (IDE) such as for example the IDE as described more fully with respect to FIG. 4 or can be another IDE. System 400 can execute wholly or partially outside an IDE. System 400 can operate within or be associated with a browser such as for example, Microsoft Internet Explorer®, Mozilla's Firefox, or any browser now known or developed in the future. It will be appreciated that system 400 is not restricted to operation within or in association with a browser.

System 400 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

A system 400 can include one or more processors such as processor 142, etc., memory 144, and one or more of the following: a language compiler 404, a JIT compiler 408, a bailout engine 414, a debugger 416, an interpreter 418 and/or a debugger display 420 that can display debug information. The language compiler 404, JIT compiler 408, bailout engine 414, debugger 416 and interpreter 418 can be implemented as one or more program modules which when loaded into memory 144 cause the one or more processors 142, etc. to perform the actions attributed to the language compiler 404, the JIT compiler 408, the bailout engine 414, the debugger 416, and/or the interpreter 418 respectively. System 400 may include other components known in the arts which are not shown.

As shown in FIG. 1*d*, system 400 can include a language compiler such as language compiler 404. Language compiler 404 can be a compiler that receives source code written in a particular programming language and generates intermediate language such as intermediate language (IL) 406 therefrom. Parts or all of the source code can be processed by the language compiler 404 to create intermediate language code such as IL 406. Language compiler 404 can receive source code such as source code 402 or portions thereof. Source code 402 can be written in any programming language. Source code 402 or portions thereof can be interpreted by sending source code 402 to interpreter 418. Thus, parts of source code 402 can be compiled. Parts of source code 402 can be interpreted. Whether a program part is compiled or interpreted may be based on performance heuristics: if a particular program part runs faster in native mode, it may be compiled into native mode, if a particular program part runs faster in interpreted mode, it may be interpreted.

As shown in FIG. 1*d*, system 400 can include a JIT compiler such as JIT compiler 408. JIT compiler 408 can receive intermediate language such as IL 406 and can generate native code such as native code 410 therefrom. The native code 410 can be loaded into a process such as process 412 for execution. JIT compiler 408 can be implemented as a JavaScript compiler, a VBScript compiler, a Python compiler, or as a compiler for another dynamic language or dynamic scripting language mentioned elsewhere herein or otherwise known. JIT compiler 408 is referred to as a "just in time" compiler, because particular program portions may be compiled by JIT compiler 408 as the compiled native code is needed (e.g., is going to be executed imminently) rather than pre-compiling native code in its entirety prior to execution. JIT compiler 408 can generate compiled native code, having the form of machine executable code or instructions.

JIT compiler 408 can perform code optimizations, based on assumptions as described above. JIT compiler 408 can insert one or more defined debug bailout points in the compiled code it generates. Debug bailout points are locations in the program at which native mode debugging may transition to interpreted mode debugging, providing certain debug bailout conditions are met. Debug bailout points such as at the beginning of a function, at the back edge of a loop, when a function returns, when a call to a helper function or library returns, or when a debugger statement is encountered, can be defined for the program. When a debug bailout occurs, execution of the native code can stop. Current state of the program executing in native mode can be captured in a debug bailout record that can record the current execution point, a location in the source code 402 corresponding to the debug bailout point location, variable values and where the variable values are located in the register and/or where the variable values are located in the stack. The debug bailout record for that debug bailout point can be passed to a bailout engine.

As shown in FIG. 1*d*, system 400 can include a bailout engine such as bailout engine 414. The bailout engine 412 can receive one or more debug bailout records. The bailout engine 414 can restore the state (e.g., value) of variables needed by the interpreter. The bailout engine 414 can create a new frame for the stack. If a variable needed by the interpreter has become inactive the bailout engine 414 can resurrect an inactive variable by changing the state of the variable from inactive to active. The bailout engine 414 can instantiate an instance of the interpreter 418, pass the interpreter the location in the source code corresponding to the debug bailout point in the native code and the newly created interpreter frame including the values of all the restored active variables. If the debug bailout location is located within a section of code such as a function, the point at which debugging resumes in interpreted mode can be at the beginning of the section of code (e.g., debugging can resume at the beginning of the function instead of at the point at which the debug bailout point was encountered).

When a debug bailout is triggered, debugging of the native code can stop. Execution of the native code can stop. State can be captured in a debug bailout record that records the current execution point, variable values and where the variable values are located. Variable values can be stored in CPU registers or can be stored on the native stack. The debug bailout record for that bailout point can be passed to the bailout engine 414. The bailout engine 414 can restore the state (e.g., value) of variables needed by the interpreter on a stack created for the interpreter. The bailout engine 414 can create a new interpreter frame for the stack. If a variable needed by the interpreter has become inactive the bailout engine 414 can resurrect a variable by changing the state of the variable from inactive to active. The bailout engine 414 can instantiate an instance of the interpreter 418, pass the interpreter the location in the source code corresponding to the debug bailout point in the native code and the newly created interpreter frame including the values of all the restored active variables.

As shown in FIG. 1*d*, debugger such as debugger 416 can receive native code for debugging. A debugger as described herein can run in native mode, meaning that the debugger can perform debug operations on native code. The debugger in accordance with some aspects of the subject matter described herein can provide current values of program variables and stack information for display on a debugger display. Debugging operations including inspection of variables, expression evaluation and modification of values can use the native frame in the call stack. Whenever a variable is saved into a register (e.g., when a variable is defined in the program), the value can also be saved to a stack location for the function. To keep track of the location of the value of particular local variable, in accordance with aspects of the subject matter described herein, each time a local variable is defined (i.e. a value is assigned to the local variable), it can be written into a stack location. Stack locations used for local variables for a function can be grouped together so that there is one stack region in which local variables for a function can be found. Thus a current value of any local variable for a particular function is always in a corresponding stack location, even if native code is using a register for the variable. The same area of the stack can be used for spilling (i.e., when there are more live variables than the computing device has registers, variables may be "spilled" from registers to memory). The stack locations can be used by the debugger to get and change values of variables. To support modification of values in the debugger, an indicator can be located adjacent to the area of the stack in which local variables are stored. The indicator can be a flag which when set indicates that a local variable in the function being debugged was changed by the user. The debugged function can be the function on the topmost stack frame or a function in a stack frame below. For example, suppose a break point is encountered. A user can change the value of a local variable that belongs to a function associated with a stack frame than is not the current stack frame, while executing the function in native mode. A flag indicating that a local variable in the function has been changed will be set in the stack frame associated with the function whose local variable was changed by the user.

Function metadata includes information concerning how many local variables are used in the function. In accordance with some aspects of the subject matter described herein, to get the value of a local variable, the debugger can determine the value of a local variable by reading the value in the stack locations that reside at the offset from the beginning location in the stack equal to the identifier of the local variable. To change the value of a local variable, the debugger can write a new value into the corresponding stack location and can set a changed local variable flag (located on the stack next to an area in which local variables can be stored) to indicate that a local variable in the function has been changed.

When execution returns to the function running in native mode, the bailout engine can check the changed local variable flag. In the event that a local variable value was changed for the stack frame corresponding to the function to which execution returns, the flag will be set, and bailout to interpreted mode will be triggered. During bailout, values of local variables can be restored from stack locations (instead of from registers), and the debugger miming in interpreted mode will receive the value to which the modified local variable was changed.

The debugger can transition from executing in native mode to executing in interpreted mode at defined points in the program called debug bailout points. Debug bailout points include but are not limited to the following: at the beginning of a function, at the back edge of a loop (e.g., after a counter is incremented and the counter has been checked for being out of range), when returning from a call to a function, when returning from a call to a library, when returning from a call to a helper function, when a debugger language statement is encountered and so on. A debugger as described herein can run in interpreted mode. In interpreted mode the debugger can debug interpreted code. For example, debug operations that control execution of the program being debugged can run in interpreted mode. Execution control operations can be implemented via asynchronous break, stepping, breakpoint, and/or break on exception operations.

An asynchronous break can occur, for example, when a user in a debug session pauses execution (e.g., by activating a pause option in a debugger user interface). A pause can occur at any time. As the debugger is expected to break execution of the program in a reasonable time after a user action. Providing a timely response to a user action can be done by inserting checks at locations in the code including but not limited to: at the beginning of a function, in a loop, etc. In response the debugger can set a transition flag that when set forces transition from native mode debugging to interpreted mode debugging. One transition flag for each thread in the process may be provided. When executing native code enters a function or goes to beginning of a loop, the transition flag can be examined. If the transition flag is set, debug bailout can be triggered and execution can transition from native mode debugging to interpreted mode debugging. Source code analogous to the function can be retrieved and sent to the interpreter. The debugger can detect the asynchronous break and can clear the transition flag. Asynchronous break can be completed by breaking (stopping) execution and displaying current program state on the debugger display.

A step operation can be a user-directed action that steps into a function, steps out of a function or steps over a function or instruction. At the beginning of each step debug operation, the debugger can set a step type flag and a step frame base flag. The step frame base flag can be set to the current function stack frame base. The step frame flag can be used to check stack depth to detect recursion. In accordance with some aspects of the subject matter disclosed herein, transfer to interpreter mode is not done when execution leaves the same function on top of the frame as when the step operation started on the stack. For example, consider a current location being at function A and the user intends to step out which would return to function B, the caller of function A. If function A calls another function, which could be function A or function B, when control returns back to function A or function B or to another function while original stack frame of function A when step is started is still on stack, debug bailout is not triggered.

For a step out operation, the debugger can set the step type flag to step out. Program execution can resume. When execution returns from the current function into another function executing in native mode, the bailout engine can determine if the step type flag and the step frame flag are set. If so, the current stack frame base can be compared to the value stored in the step frame flag. If the current stack frame base is greater than the value stored in the step frame flag, assuming that stack grows up towards lesser addresses, stack depth has decreased. In response to a decrease in stack depth, bailout to interpreter mode can be triggered. The debugger can transition to debugging interpreted code. Execution can stop and current program state can be displayed on the debugger display.

When native code enters another function executing in native mod e or if a step in operation was made on the last statement of the function which results in return from the function, the bailout check for these flags occurs, and bailout to interpreter mode debugging is triggered. The debugger operates in interpreted mode and can display current program state on the debugger display.

For step over debug operations, the function to step over is not forced to run in interpreter mode and typically runs in native mode. Bailout can only be triggered when the step operation was on the last statement of the current function and results in a return from the function. In response to a decrease in stack depth, bailout to interpreter mode debugging is triggered. The debugger can display current program state on the debugger display.

When the user sets a break point in a function, the debugger can update function metadata by incrementing a counter that tracks the number of break points in the function. When the function is executed (either the function starts executing or the function calls another function and the called function returns back to the calling function), conditions triggering debug bailout are checked. If the break point count for the current function is greater than zero, debug bailout can be triggered and the debugger can transition to executing in interpreted mode. The debugger can stop at the statement at which the break point is set and can display the current execution point on the debugger display.

If a break point on exception/continue after exception is encountered, the program run under the debugger can communicate the exception event to the debugger and can continue execution from the next statement after the statement that caused the exception or can set execution to resume at a specific statement and continue from that statement. To notify the debugger, native code can use a "throwing helper" function so that all throws are routed through it. The debugger can stop at the statement that threw the exception and can display values of variables on the debugger display.

To continue to the next statement, (in case the program was running in native mode when the exception was thrown), the compiler can identify all places in the program where the exception may occur. Exceptions can be thrown by an explicit throw statement, when a call is made to a helper function or when a call is made to a library function. For example, the JavaScript delete statement which deletes a property from an object, can throw an exception if the object is null or undefined. The exception is thrown because a null or undefined object does not have any properties. Here "helper" refers to a function implemented in the language (e.g., in the JavaScript engine), typically in native code, and is used to perform some operation or language construct, such as to delete a property from an object. "Library function" refers to a function that implements a library routine. For example, JavaScript has a number of library objects, such as "string". The "string" object has a number of operations, including string.concat, for example. String.concat is not a pure language routine. In some languages it may not be reasonable to distinguish between a library function and a helper function, but in some languages such as but not limited to JavaScript they differ in the following sense: a library call is technically the same as a script (i.e., user) function call and thus can be intercepted. For example, a user can assign a script function to string.concat. The next time string.concat is called, the engine will call the reassigned user function instead of the original string.concat function. Helper functions cannot be intercepted and are typically called directly in native/compiled code.

To continue after an exception occurs in native code, each helper call and each library call can be wrapped in a try-catch statement block. In the "try" part of the try-catch block a helper function can be called. The values returned by the original helper function can be saved into a local variable. In the "catch" part of the try-catch block if a "continue after exception" option is enabled in the interpreted mode debugger an exception and continue flag can be set. After the "catch" part of the try-catch block the value of original helper can be returned. The debug bailout check to continue after an exception can be inserted after each return from each call to a helper function call or after each return from a call to a library. The debug bailout check can check the exception and continue flag and can trigger a debug bailout to interpreter mode if the flag is set. The debugger can transition to interpreter mode enabling execution control to continue within the debugger. For example, if the user response to "break on exception" were to step over an instruction, the debugger would step to the next statement. If the user response to "break on exception" were to continue, the debugger would continue execution of the rest of the function in interpreted mode.

A debugger can display debug information on a debugger display device such as debugger display 420. The debugger can display information from the call stack, local variable values, etc. on the debugger display.

Figure 2:
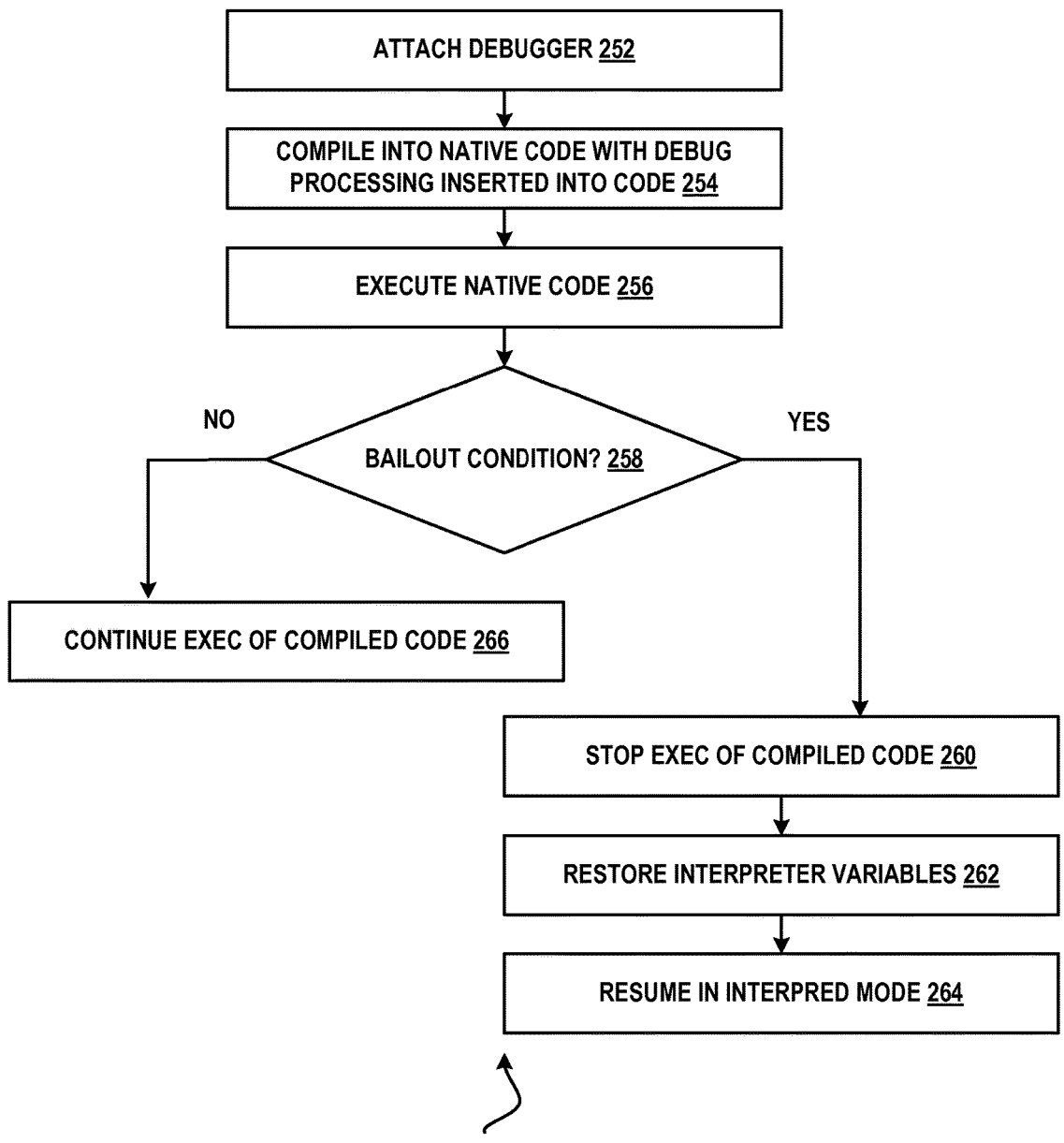
FIG. 2 illustrates an example of a method 250 that transitions from debugging native code to debugging interpreted code in accordance with aspects of the subject matter disclosed herein.

FIG. 2 illustrates a method 250 that can transition from native mode debugging to interpreted mode debugging in accordance with aspects of the subject matter disclosed herein. The method described in FIG. 2 can be practiced by a system such as but not limited to the one described with respect to FIG. 1*d*. While method 250 describes a series of operations that are performed in a sequence, it is to be understood that method 250 is not limited by the order of the sequence. For instance, some operations may occur in a different order than that described. In addition, one operation may occur concurrently with another operation. In some instances, not all operations described are performed.

In operation a system such as the system described in FIG. 1*d* can operate as follows. At operation 251, debug bailout points can be defined for a program. Debug bailout points are points in the program where a transition from native mode debugging to interpreted mode debugging can occur. Debug bailout points include but are not limited to the following: at the beginning of a function, at the back edge of a loop (e.g., after a counter is incremented and the counter has been checked for being out of range), when returning from a call to a function, when returning from a call to a library, when returning from a call to a helper function, when a debugger language statement is encountered and so on. When the program is compiled, debug processing can be inserted at the debug bailout points.

At operation 252 a debug session can be initiated. When a debug session is initiated, any native code previously generated for the program miming in the process to which the debugger is attached can be discarded. At operation 254 debug-mode native code can be generated from the program to which the debugger is attached. The debug-mode native code can include processing associated with transitioning from debugging native code to debugging interpreted code. The debug-mode native code can be loaded into a process. When a function is compiled into native code in debug mode, at each bailout point in the function, one or more bailout condition checks can be inserted into the native code. Bailout condition checks can be inserted during the phase of compilation that generates an internal native representation of the program. Bailout condition checks can be inserted into the code as data for the bailout record is captured. Bailout condition checks may involve checking the status (set or unset) or values of various flags or indicators controlled by the debugger.

Debug bailout indicators or flags can include but are not limited to: an indicator that when set indicates that the debugger is to transition from native mode into interpreted mode, an indicator that when set indicates that a function has a breakpoint in it, an indicator that specifies a stack address for detecting recursion, an indicator that indicates a type of step operation to be performed, an indicator that when set indicates the type of step (step in, step out, step over) operation the debugger is performing, an indicator on the stack that when set indicates that a field was changed in the current stack frame and an indicator that when set is used for injecting an explicit unconditional bailout.

At operation 256 the native code can be executed in debug mode. When execution reaches a debug bailout point, various bailout conditions can be checked. The bailout conditions checked for one type of debug bailout scenario may differ from the bailout conditions checked for other types of bailouts. For example, suppose a user pauses execution of a program running under the debugger at the beginning of a function or at the back edge of a loop (when the counter for the loop is incremented and the counter is checked for being in range). The debugger can set a flag that forces the native code to bailout to interpreter mode when the native code inserted at the beginning of the function or at the back edge of the loop checks to see if the flag that forces the native code to bailout to interpreter mode is set. Suppose instead that a user selects an option in a debugger UI that steps into a function. The debugger can set a step flag that indicates what type of step operation was requested. The check performed by the native code may bailout in response to determining that the step flag's value is set to "step in". Suppose a user action places a breakpoint somewhere in a function. The debugger may increment a flag that keeps track of the number of breakpoints in the function. If the break point count in the current function is greater than zero, bailout is triggered, the execution goes into interpreted mode.

When execution reaches the frame that has the breakpoint, execution of the program in native code stops, the bailout engine receives the debug bailout record, the function is sent to the interpreter and debugging of the interpreted function continues from the beginning of the function. At operation 260 in response to determining that at least one bailout condition has been met at operation 258, debugging in native mode can stop and debugging can transition to interpreted mode. A transition from debugging native code to debugging corresponding interpreted code can be triggered by a user initiated action or can be triggered when an explicit unconditional bailout is encountered.

At operation 262 interpreter variables can be restored from the bailout record. If any bailout condition is met, a snapshot of execution state (location and value of variables, location and value of temporary variables, and stack values can be made and persisted in a debug bailout record. The debug bailout record can be sent to the bailout engine. The bailout engine can instantiate an instance of the interpreter and can set up the interpreter stack frame for interpreter. At operation 264 debugging can resume in interpreted mode. At operation 266, if no bailout condition is detected at operation 258, debugging in native mode can continue.

Example of a Suitable Computing Environment

Figure 3:
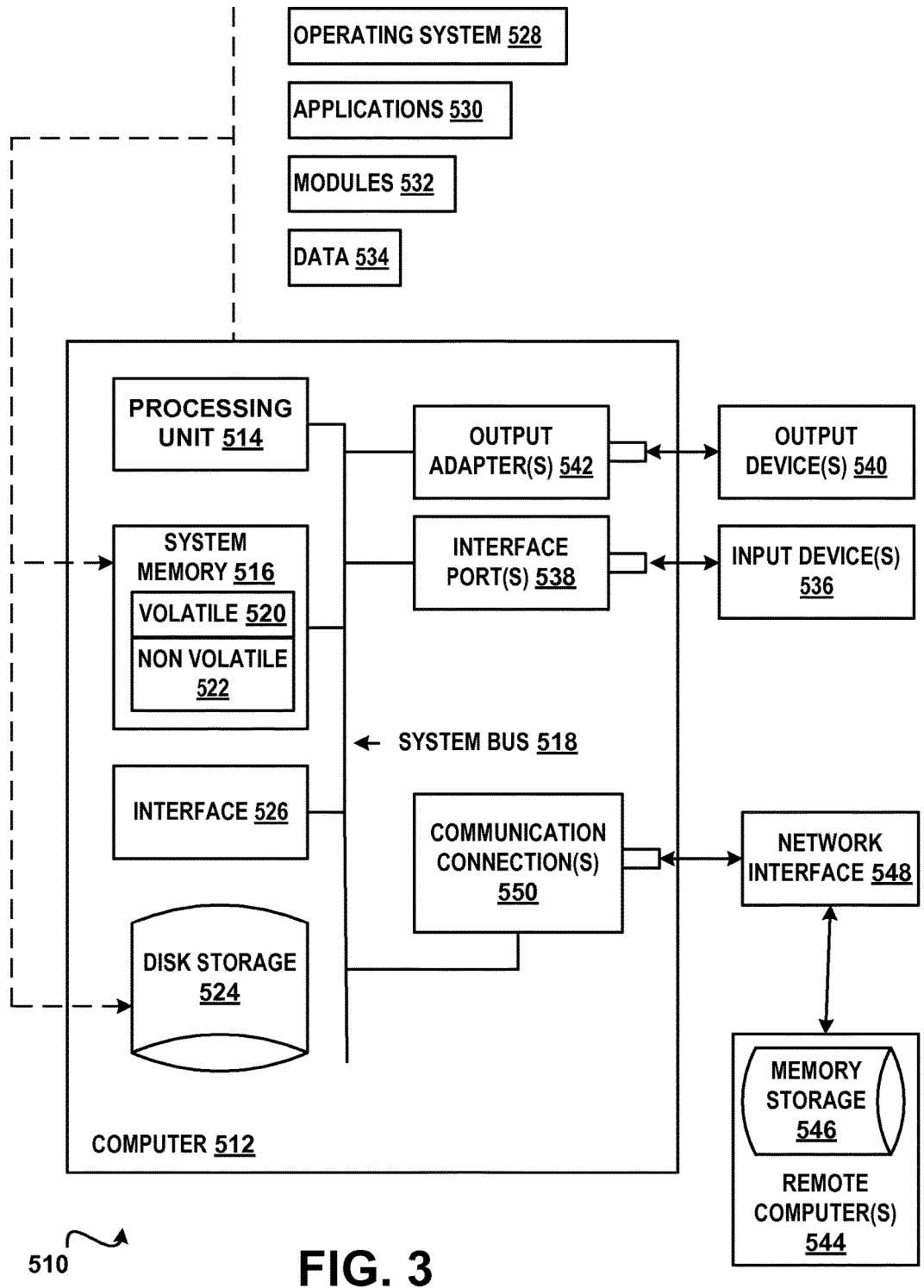
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
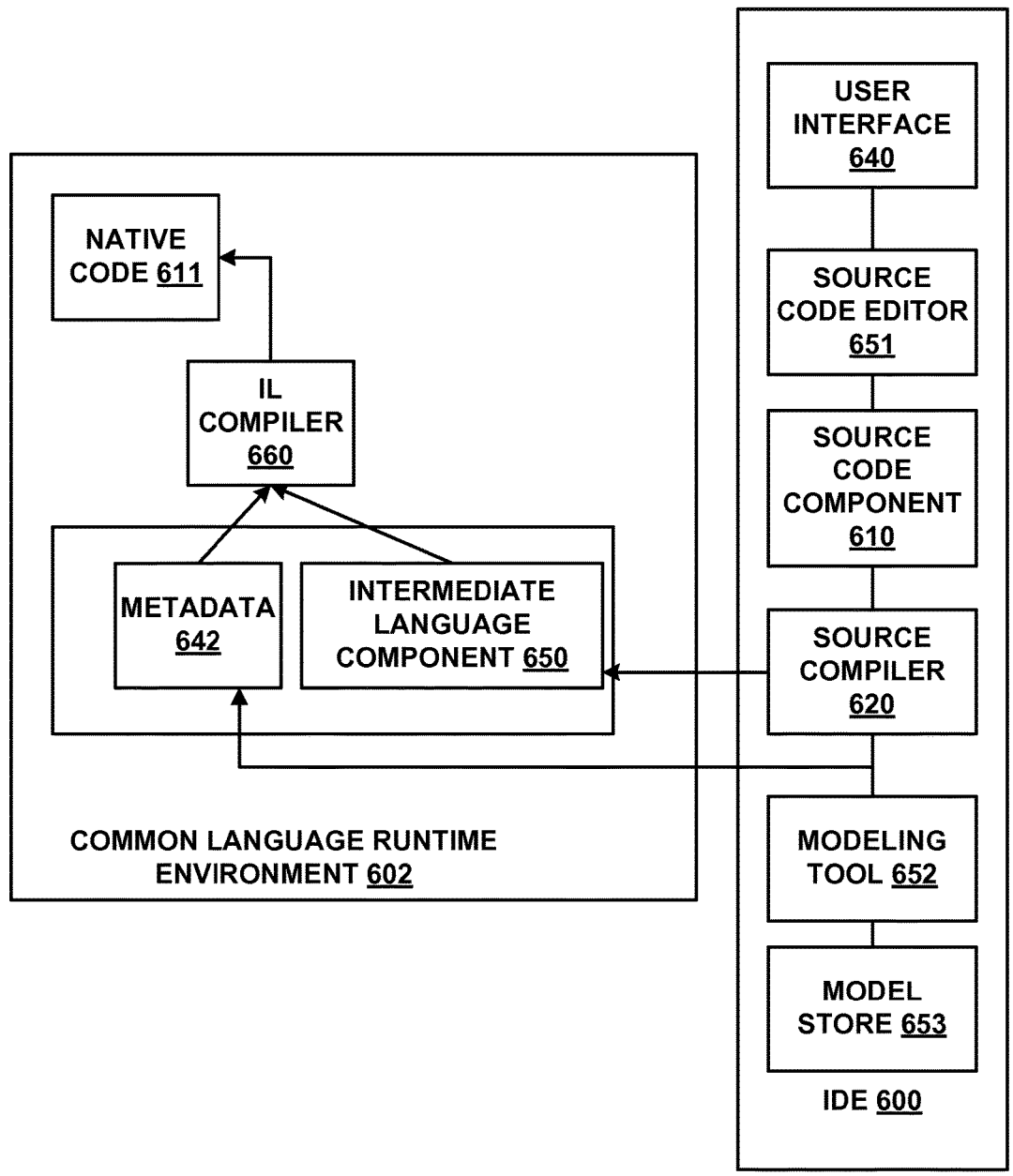
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft.NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above.

What is claimed:
1. A system comprising:
    at least one processor of a computing device;
    a memory of the computing device; and
    a debugger causing the at least one processor to:
        execute native code of a program, the native code including at least one pre-determined debug bailout point, the at least one pre-determined debug bailout point representing a location in the program at which the debugger automatically transitions to debugging non-native code when at least one debug bailout condition is met; and in response to detecting that the at least one debug bailout condition has been met:
receive current state of the native code executing under the debugger;
instantiate an instance of an interpreter;
create an interpreter stack frame for the instance of the interpreter;
populate the interpreter stack frame for the instantiated interpreter with the current state of the native code; and
transition from debugging the native code representing the program to debugging corresponding non-native code representing the program.

2. The system of claim 1, further comprising:
a just-in-time (JIT) compiler causing the at least one processor to generate the native code of the program.

3. The system of claim 1, further comprising:
at least one program module causing the at least one processor to:
receive defined bailout locations for the program comprising at least one of:
at a beginning of a function, at a back edge of a loop, when a function returns, when a call to a helper function returns, when a call to a library returns or when a debugger statement is encountered.

4. The system of claim 1, further comprising:
at least one program module causing the at least one processor to:
debug the corresponding non-native code representing the program using at least one execution control operation.

5. The system of claim 4, wherein the execution control operation comprises one of: an asynchronous break operation, a stepping operation, detecting a breakpoint, or a break on exception operation.

6. The system of claim 1, further comprising:
at least one program module causing the at least one processor to:
execute a debug operation in native mode, the debug operation modifying a current value of a variable, the native mode comprising debugging the native code representing the program.

7. The system of claim 1, further comprising:
at least one program module causing the at least one processor to:
in response to saving a variable defined in the program into a register, save the variable to a stack location, the stack location comprising a particular localized area of the stack associated with the program.

8. The system of claim 1, further comprising:
at least one program module causing the at least one processor to:
detect that the at least one debug bailout condition has been met by checking status of at least one runtime flag.

9. A method comprising:
initiating a debug session for the program;
discarding previously generated native code for the program;
generating native code for debugging, the generated native code comprising at least one pre-determined debug bailout location for the program, the at least one pre-determined debug bailout location comprising a location in the generated native code at which debugging automatically transitions from debugging native code to debugging corresponding non-native code when a debug bailout condition has been met, the at least one pre-determined debug bailout location comprising one of: at a beginning of a function, at a back edge of a loop, when a function returns, when a call to a helper function returns, when a library returns, or when a debugger statement is encountered in the native code;
executing the generated native code under a debugger;
in response to determining that the debug bailout condition has been met, continuing the execution of the generated native code in interpreted mode under the debugger;
restoring interpreter variables corresponding to variables associated with the executed generated native code; and
resuming debugging of the program in interpreted mode at a point in the non-native code corresponding to a point in the executed generated native code at which debugging of the executed generated native code stopped.

10. The method of claim 9, wherein a just-in-time (JIT) compiler generates the native code for debugging.

11. The method of claim 9, wherein resuming debugging of the program in interpreted mode includes
receiving a debug operation comprising an execution control operation comprising one of an asynchronous break operation, a step operation, a breakpoint, or a break on exception operation.

12. The method of claim 9, further comprising:
debugging in interpreter mode a select frame of a stack associated with the non-native code, and debugging other parts of the program in native mode.

13. The method of claim 9, further comprising:
in response to detection of a break on exception operation, debugging a select frame of a stack, the select frame associated with execution of the native code;
in response to detection of a step or continue operation, transitioning to the interpreted mode.

14. The method of claim 9, further comprising:
determining that the debug bailout condition has been met by determining a stack depth of a stack associated with the program.

15. A device, comprising:
at least one processor and a memory; the at least one processor is to:
execute native code of a program, the native code including at least one pre-determined debug bailout point, the at least one pre-determined debug bailout point representing a location in the program at which the debugger automatically transitions to debugging non-native code when at least one debug bailout condition is met; and
in response to determining that the at least one bailout debug condition has been met, the bailout debug condition comprising receiving an execution control operation, transition from debugging native code representing the program to debugging corresponding non-native code representing the program, wherein the execution control operation includes at least one of an asynchronous break, a step out operation, a step over operation, a break point, a break on exception operation, or a stepping operation.

16. The device of claim 15, wherein the at least one processor is to:
in response to receiving an execution control operation implemented by an asynchronous break at the beginning of a function or in a loop in the program, set a flag in a thread that forces transition from native mode debugging to interpreted mode debugging.

17. The device of claim 15, wherein the at least one processor is to:
- in response to receiving an execution control operation implemented by a step out operation, the step out operation stepping out of a function, save a current stack frame base address for stack depth or recursion detection;
- in response to a function return, compare current stack depth to a stack depth associated with the saved current stack frame base address; and
- in response to determining that the stack depth decreased, transition from native mode debugging to interpreted mode debugging.

18. The device of claim 15, wherein the at least one processor is to:
- in response to receiving an execution control operation implemented by a step over operation, the step over operation stepping over a function, save a current stack frame base address for stack depth or recursion detection;
- in response to determining the step over operation was on a last statement of the function and results in a return from the function, compare current stack depth to the stack depth associated with the saved current stack frame base address; and
- in response to determining that the stack depth decreased, transition from native mode debugging to interpreted mode debugging.

19. The device of claim 15, wherein the at least one processor is to:
- in response to receiving an execution control operation implemented by a break point in a function, increment a counter tracking a number of break points in the function;
- execute the function; and
- in response to determining that the counter is greater than zero, when entering the function, transition from native mode debugging to interpreted mode debugging.

20. The device of claim 15, wherein the at least one processor is to:
- in response to receiving an execution control operation implemented by a continue operation after an exception was thrown, wrap a call to a function in a try-catch statement block; and
- transition to interpreter mode enabling execution control to continue within the debugger.

* * * * *